US012566487B2

(12) United States Patent
Ray

(10) Patent No.: US 12,566,487 B2
(45) Date of Patent: Mar. 3, 2026

(54) REDEPLOYING SERVICES IN COMPUTING SYSTEMS BASED ON POWER CONSUMPTION NEEDS OF THE SERVICES

(71) Applicant: INTERNATIONAL BUSINESS MACHINES CORPORATION, Armonk, NY (US)

(72) Inventor: Kaustabha Ray, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 18/634,769

(22) Filed: Apr. 12, 2024

(65) Prior Publication Data

US 2025/0321628 A1 Oct. 16, 2025

(51) Int. Cl.
G06F 1/00 (2006.01)
G06F 1/3296 (2019.01)

(52) U.S. Cl.
CPC .................................. G06F 1/3296 (2013.01)

(58) Field of Classification Search
CPC ..................................................... G06F 1/3296
See application file for complete search history.

(56) References Cited

U.S. PATENT DOCUMENTS

| | | | |
|---|---|---|---|
| 10,169,220 B2 | 1/2019 | Rajagopalan | |
| 2020/0322763 A1* | 10/2020 | Zhou ........................ | H04L 1/003 |

| | | | | |
|---|---|---|---|---|
| 2021/0117307 | A1* | 4/2021 | MacNamara ....... | G06F 11/3433 |
| 2022/0086075 | A1* | 3/2022 | Nee ...................... | H04L 43/0888 |
| 2023/0230194 | A1* | 7/2023 | North ...................... | G06F 1/206 |
| 2024/0040423 | A1* | 2/2024 | Gothe .................... | G06Q 10/20 |
| 2024/0129195 | A1* | 4/2024 | Ji .......................... | H04L 41/122 |
| 2024/0169081 | A1* | 5/2024 | Fox ......................... | H04L 63/20 |
| 2024/0330715 | A1* | 10/2024 | Mene ..................... | G06N 5/022 |

OTHER PUBLICATIONS

"Clusterdata / cluster-trace-microservices-v2022," 9 pp., [online][retrieved Apr. 2, 2024] https://github.com/alibaba/clusterdata/tree/master/cluster-trace-microservices-v2022.
A. Radovanovic, et al., "Carbon-Aware Computing for Datacenters," arXiv:2106.11750v1, Jun. 2021, 14 pp.

(Continued)

*Primary Examiner* — Mohammed H Rehman
(74) *Attorney, Agent, or Firm* — Konrad, Raynes, Davda & Victor LLP; David Victor

(57) ABSTRACT

Provided are a computer program product, system, and method for redeploying services in computing systems based on power consumption needs of the services. A call graph indicating multiple calls between interlinked services. A determination is made of a first service in the call graph consuming energy at a first service power mode in one of the computing systems. A determination is made of a second service, in one of the computing systems, operating at a second service power mode requiring less energy than a power mode of the computing system including the second service. The second service is in a subgraph of the call graph extending from the first service. An alternative computing system is determined, comprising one of the computing systems not including the second service, operating at the second service power mode. The second service is redeployed to the alternative computing system.

20 Claims, 4 Drawing Sheets

(56) References Cited

OTHER PUBLICATIONS

B. Acun, et al., "Carbon Explorer: A Holistic Framework for Designing Carbon Aware Datacenters," aiXiv:2201.10036v3, Feb. 2023, 15 pp.

B. Butzin, et al., "Microservices Approach for the Internet of Things," IEEE, 2016, 6 pp.

G. Premsankar, "Energy-Efficient Service Placement for Latency-Sensitive Applications in Edge Computing," IEEE, Inst Electrical Electronics Engineers, Inc., Sep. 15, 2022, 13 pp.

N. Daw, et al., "Xanadu: Mitigating cascading cold starts in serverless function chain deployments," ACM, Middleware '20, Dec. 7-11, 2020, 16 pp.

P. Wiesner, et al., "Let's Wait Awhile: How Temporal Workload Shifting Can Reduce Carbon Emissions in the Cloud," ACM, Middleware '21, Dec. 6-10, 2021, 13 pp.

R. Brondolin, et al., "PRESTO: a latency-aware power-capping orchestrator for cloud-native microservices," IEEE, 2020 IEEE International Conference on Autonomic Computing and Self-Organizing Systems (ACSOS), 2020, 10 pp.

T. Behreini, et al., "An Approximation Algorithm for Minimizing the Cloud Carbon Footprint through Workload Scheduling," IEEE, 2022 IEEE 15th International Conference on Cloud Computing (CLOUD), 2022, 10 pp.

T. Yang, et al., "Carbon Management of Multi-Datacenter Based on Spatio-Temporal Task Migration," IEEE, IEEE Transactions on Cloud Computing, vol. 11, No. 1, Jan.-Mar. 2023, 13 pp.

* cited by examiner

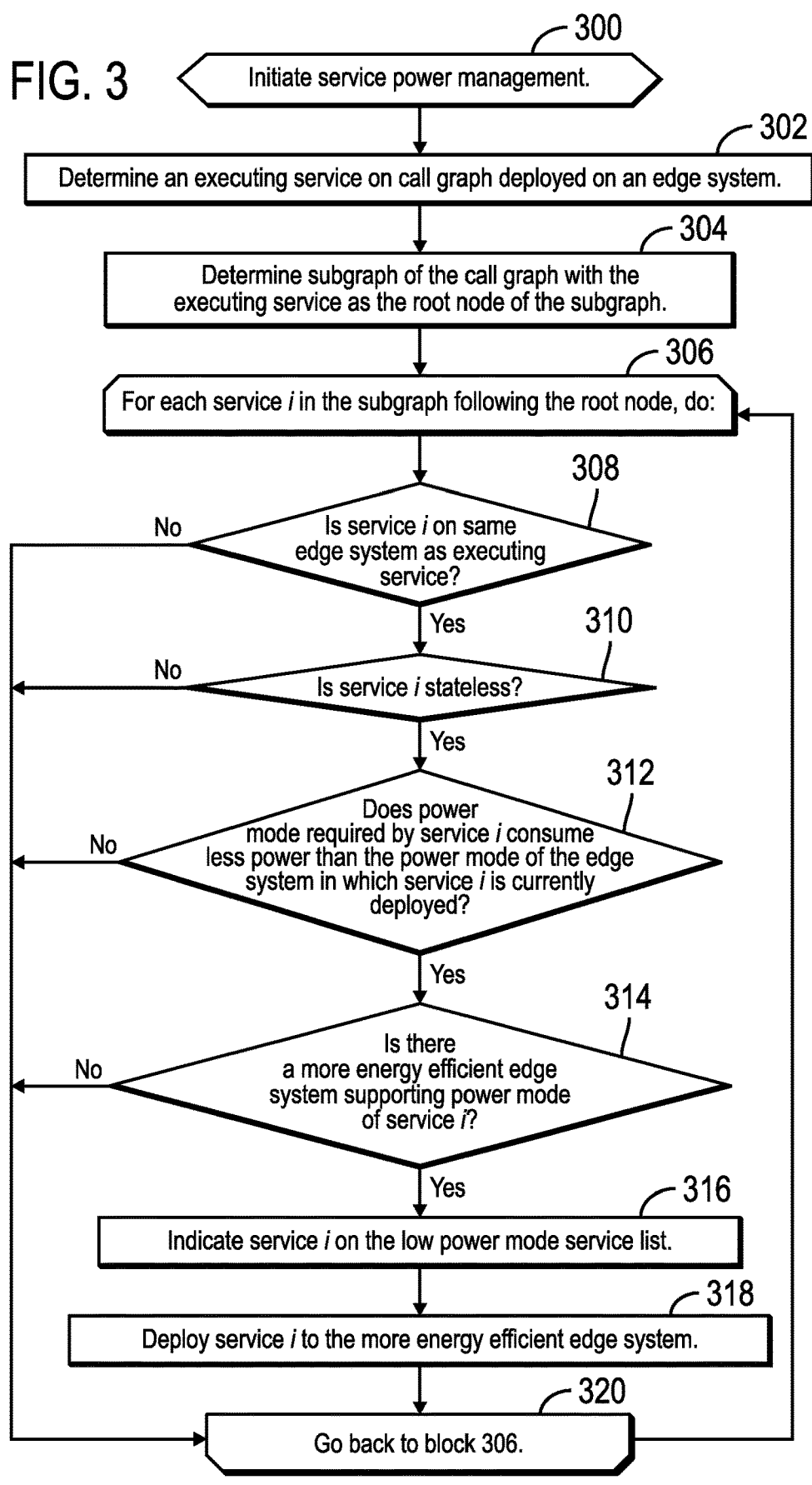

FIG. 3

300
Initiate service power management.

302
Determine an executing service on call graph deployed on an edge system.

304
Determine subgraph of the call graph with the executing service as the root node of the subgraph.

306
For each service *i* in the subgraph following the root node, do:

308
Is service *i* on same edge system as executing service?
No
Yes

310
Is service *i* stateless?
No
Yes

312
Does power mode required by service *i* consume less power than the power mode of the edge system in which service *i* is currently deployed?
No
Yes 314
Is there a more energy efficient edge system supporting power mode of service *i*?
No
Yes 316
Indicate service *i* on the low power mode service list.

318
Deploy service *i* to the more energy efficient edge system.

320
Go back to block 306.

400

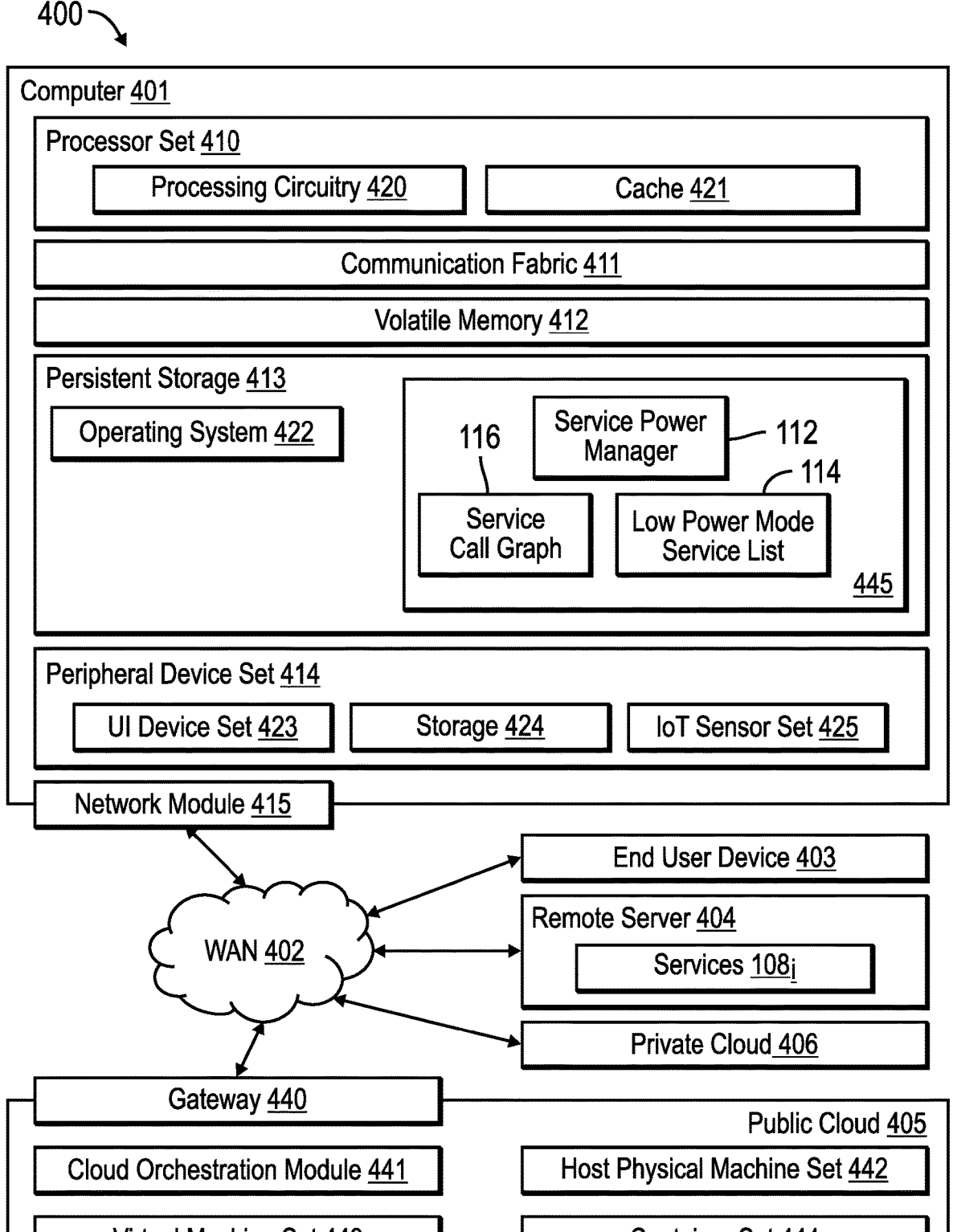

Computer 401

Processor Set 410

Processing Circuitry 420     Cache 421

Communication Fabric 411

Volatile Memory 412

Persistent Storage 413

Operating System 422

116

Service Power Manager    112

Service Call Graph    114

Low Power Mode Service List

445

Peripheral Device Set 414

UI Device Set 423     Storage 424     IoT Sensor Set 425

Network Module 415

WAN 402

End User Device 403

Remote Server 404

Services 108i

Private Cloud 406

Gateway 440

Cloud Orchestration Module 441

Virtual Machine Set 443

Public Cloud 405

Host Physical Machine Set 442

Container Set 444

FIG. 4

REDEPLOYING SERVICES IN COMPUTING SYSTEMS BASED ON POWER CONSUMPTION NEEDS OF THE SERVICES

BACKGROUND OF THE INVENTION

1. Field of the Invention

The present invention relates to a computer program product, system, and method for redeploying services in computing systems based on power consumption needs of the services.

2. Description of the Related Art

Cellular service providers maintain cellular towers, also referred to as base stations, to provide cellular service to a region within signal proximity to the base station. The base stations produce data processing jobs from user equipment that are processed by microservices executing in multi-access edge computing (MEC) systems. The MEC systems provide computing and storage resources at the network's edge close to end-users to reduce processing latency. The microservices may be arranged in a call graph indicating a direction and order in which the microservices call each other on the edge systems on which they are deployed to provide a flow of operations.

SUMMARY

Provided are a computer program product, system, and method for redeploying services in computing systems based on power consumption needs of the services. A call graph indicating multiple calls between interlinked services. A determination is made of a first service in the call graph consuming energy at a first service power mode in one of the computing systems. A determination is made of a second service, in one of the computing systems, operating at a second service power mode requiring less energy than a power mode of the computing system including the second service. The second service is in a subgraph of the call graph extending from the first service. An alternative computing system is determined, comprising one of the computing systems not including the second service, operating at the second service power mode. The second service is redeployed to the alternative computing system.

BRIEF DESCRIPTION OF THE DRAWINGS

FIG. 3 illustrates an embodiment of operations to redeploy services to execute on different computing systems based on power consumption requirements of the services.

FIG. 4 illustrates a computing environment in which the components of FIG. 1 may be implemented.

DETAILED DESCRIPTION

Described embodiments provide improvements to computer technology for deploying services, such as services and microservices, organized in a call graph on computing systems based on the power requirements of the services and the power consumption of the computing systems to deploy services on the most energy efficient computing systems available. Described embodiments consider services for redeployment that are within a subgraph having as a root a currently executing service to redeploy services in real time and avoid redeploying services that are not likely to be soon called to further conserve energy. Described embodiments ensure satisfaction of latency requirements while minimizing the energy consumption.

Further, described embodiments ensure maximum probability of latency satisfaction while minimizing the energy consumption in serverless computing with a mix of long running containers and short spin-off containers on which the microservices execute. Described embodiments further provide freedom from cascading behavior of over consumption of energy when services requiring lower energy consumption are continually called on a higher energy consuming server.

Figure 1:
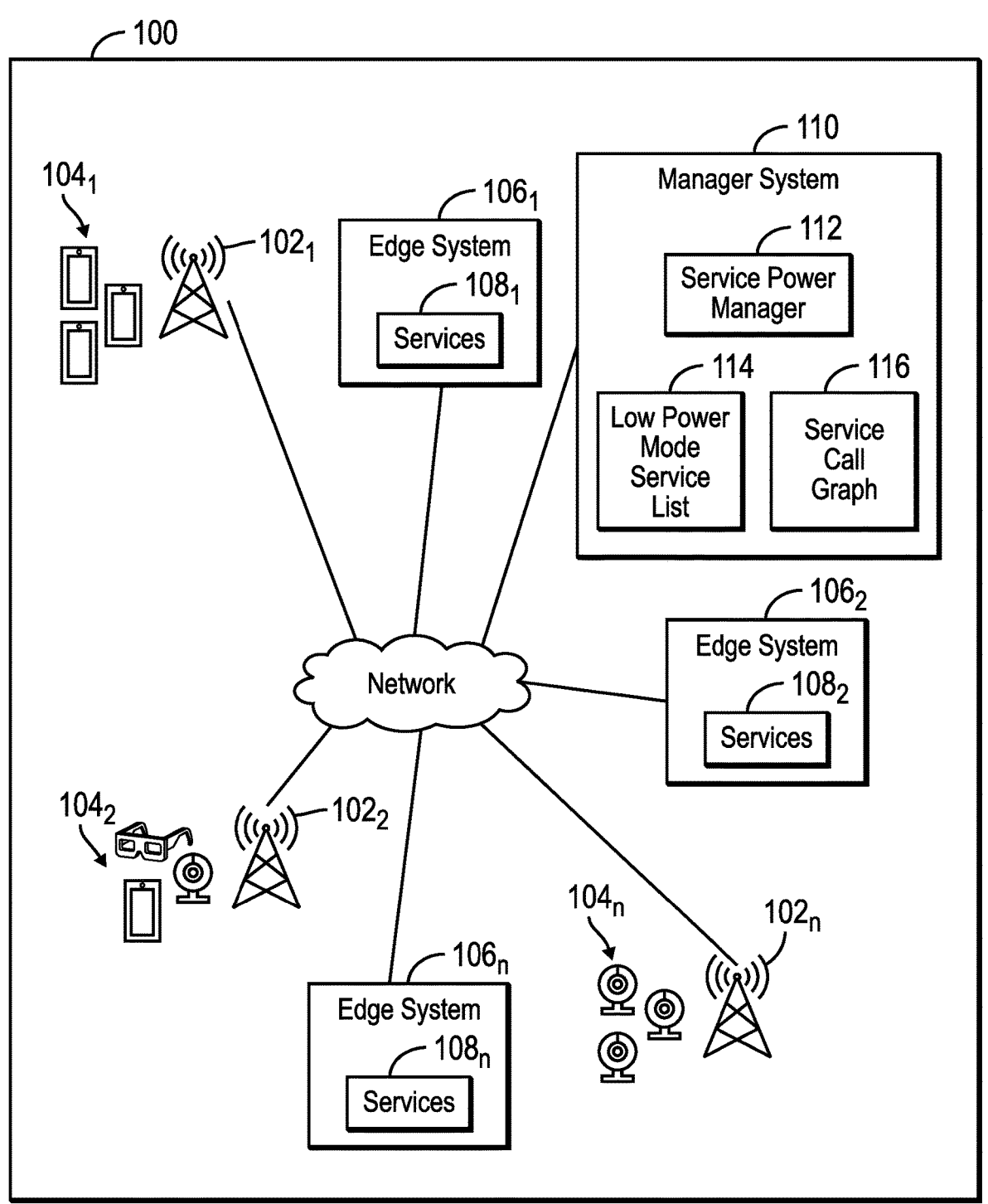
FIG. 1 illustrates an embodiment of a cellular network environment with edge systems in which embodiments are implemented.

FIG. 1 illustrates an embodiment of a cellular network 100 in which embodiments are implemented, such as, but not limited to, a 4G, 5G or 6G network. The cellular network 100 includes a plurality of base stations $102_1, 102_2 \ldots 102_n$, also referred to as static cellular stations or terrestrial stations. The data processing jobs from user equipment $104_1, 104_2 \ldots 104_n$, are received at the base stations $102_1, 102_2 \ldots 102_n$. The jobs from the user equipment $104_1, 104_2 \ldots 104_n$ may be processed in applications at edge systems $106_1 \ldots 106_n$, which may comprise multiaccess-edge computing (MEC) servers. The user equipment $104_i$ may comprise smartphones, virtual and extended reality glasses, wireless hubs, autonomous vehicles, etc. The edge systems $106_1 \ldots 106_n$ include services $108_1 \ldots 108_n$ organized in a directed call graph 116, such as a directed acyclic graph (DAG). The call graph 116 may comprise a series of calls between related services $108_1 \ldots 108_n$, distributed across the edge systems $106_1 \ldots 106_n$. A call graph maintains multiple calls between different pairs of services. For instance, a pair of services $108_i, 108_j$ connected on a same edge of the directed call graph contains one upstream service and one downstream service.

The services $108_1 \ldots 108_n$ may comprise microservices, where one or more of the microservices may form an application. The microservices may be deployed using virtual machines or containers. The microservice code is packaged into a container image and deployed as a container service on the computing systems $106_i$.

A manager system 110 comprises a computer system that includes components to manage the deployment of the services $108_1 \ldots 108_n$ across the edge systems $106_1 \ldots 106_n$ based on power consumption needs of the services $108_1 \ldots 108_n$ to ensure adequate power is provided to meet the power requirements of the services $108_1 \ldots 108_n$ and at the same time minimize power consumption. The manager system 110 includes a service power manager program 112 to determine and manage how the services $108_1 \ldots 108_n$ are deployed across the edge systems $106_1 \ldots 106_n$; a lower power mode service list 114 indicating services $108_i$ which cannot be moved to an edge system $106_i$ implementing a high power mode than required by the services $108_i$ indicated in the list 114; and a service call graph 116 representing a directed call graph of the services $108_1 \ldots 108_n$ distributed across the edge systems $106_i$.

Generally, program modules, such as the program components $108_i$ and 112, among others, may comprise routines, programs, objects, components, logic, data structures, and so on that perform particular tasks or implement particular abstract data types.

The programs $108_i$ and $112$, among others, may comprise program code loaded into memory and executed by a processor. Alternatively, some or all of the functions of these components may be implemented in hardware devices, such as in Application Specific Integrated Circuits (ASICs), Field Programmable Gate Arrays (FPGAs) or executed by separate dedicated processors.

The functions described as performed by the program components $108_i$ and $112$, among others, may be implemented as program code in fewer program modules than shown or implemented as program code throughout a greater number of program modules than shown.

The computing components $106_i$ and $110$ may comprise server class computing devices, or other suitable computing devices. Although the systems $106_i$ are described as edge systems, they may be other types of computing systems in alternative computing environments than a cellular network $100$ using edge systems to process user equipment data.

In described embodiments, operations of $108_i$ and $112$ described as performed in components $106_i$ and $110$, respectively, may be performed in other components or distributed among components.

The user equipment $104_i$ may comprise other types of computational devices providing data to be processed than user equipment communicating data with cellular base stations.

Described embodiments concern providing microservice processing at edge systems in a cellular network to service data processing transmissions through base stations. In alternative embodiments, the edge systems may be servicing user requests in environments other than cellular networks and in other types of data processing environments. Further, the edge systems may comprise other types of computing devices in a network.

Figure 2A:
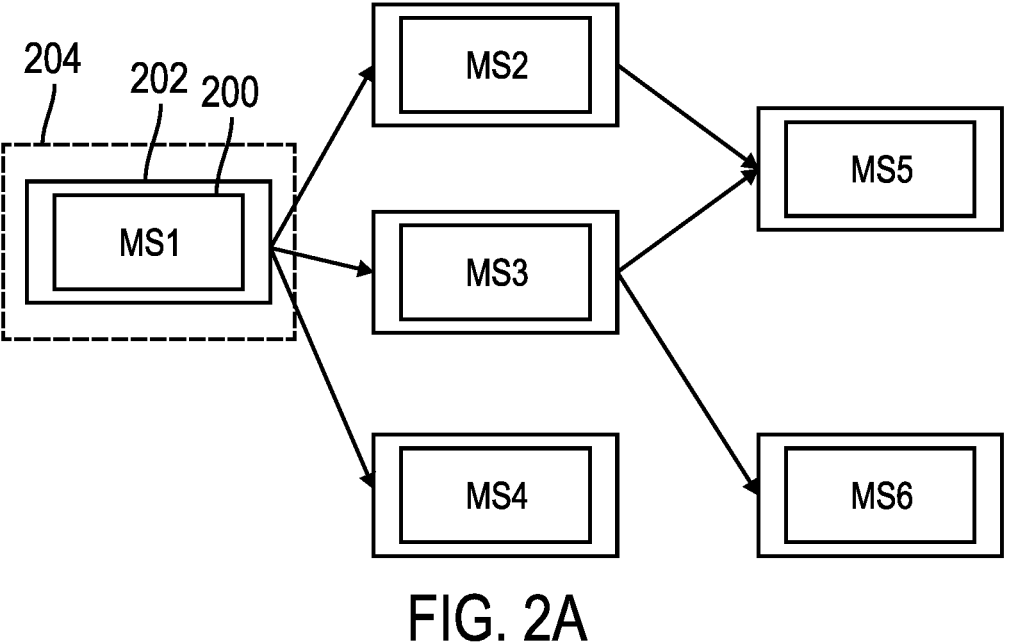
FIGS. 2A and 2B illustrate examples of call graphs or subgraphs of call graphs indicating an order and direction in which microservices call each other.
Figure 2B:
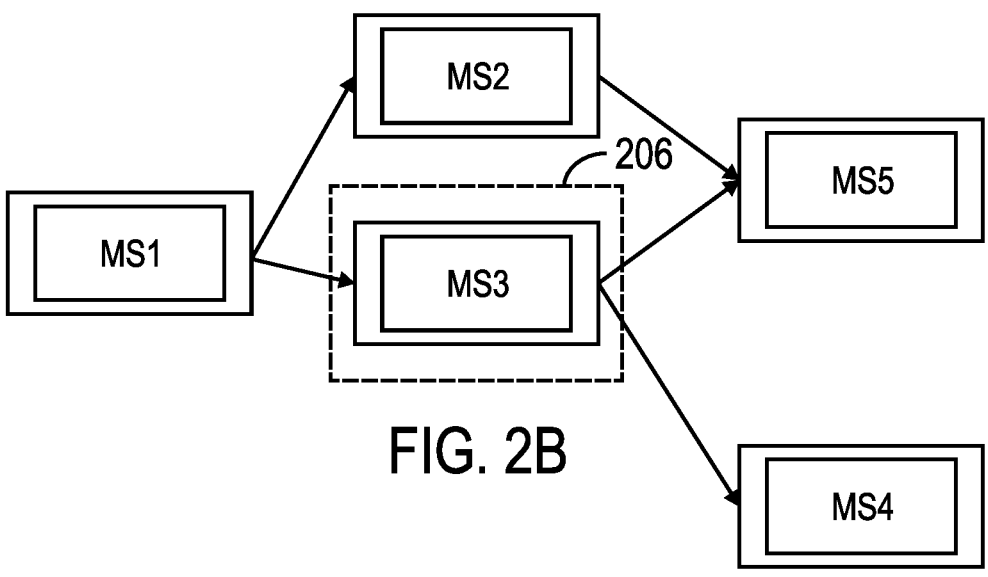

FIGS. 2A and 2B illustrate directed call graphs of microservices "MS", and may comprise a complete call graph or a subgraph of a larger call graph. The microservices, such as MS1 $200$ are shown as encapsulated in containers, e.g., $202$. Execution box $204$ in FIG. 2A indicates microservice $200$ (MS1) is currently executing and will call the next level of microservices MS2, MS3, MS4. Execution box $206$ in FIG. 2B indicates microservice 3 (MS3) is currently executing and will call the next level of microservices MS5 and MS4.

FIG. 3 illustrates an embodiment of operations performed by the service power manager $112$ to redeploy services $108_i$ to lower power consuming edge systems $106_i$. Upon initiating (at block $300$) service power management, which may be periodically initiated, the service power manager $112$ determines (at block $302$) an executing service $108_E$ in the call graph $116$ deployed on an edge system $106_i$. The service power manager $112$ determines (at block $304$) a subgraph of the service call graph $116$ with the executing service $108_E$ as the root node of the subgraph. For instance, in FIG. 2A, microservice MS1 is the executing service, and the subgraph comprises MS1 as the root node and all the following nodes MS2 . . . MS6, or the entire shown graph. The graph shown in FIG. 2A may comprise a portion of a larger call graph. In FIG. 2B, MS3 is the executing service, and the subgraph is formed of microservices MS3, MS4, and MS5. For each service i in the determined subgraph following the subgraph root node, or executing service $108_E$, the service power manager $112$ performs a loop of operations at blocks $306$ through $320$.

If (at block $308$) service i is on the same computing system as the executing service $106_E$, then a determination is made (at block $310$) whether service i is stateless. In an alternative embodiment, control may proceed to block $310$ even if the service i is running on an edge system $106_j$ different from the edge system $106_i$ in which executing service $108_E$ is running. A stateless service does not retain information about previous interactions. There is no stored knowledge of or reference to past transactions. Each transaction is made as if from scratch for the first time. A stateful service stores records and returns information in the edge system $106_i$ in which the stateful service executes. The edge system $106_i$ keeps track of the state of each user session for a stateful service, and maintains information about interactions and past requests of the stateful service. In described embodiments, only stateless services may be redeployed to a lower power consuming edge system $106_i$, whereas stateful services need to remain on the current edge system $106_i$, which stores current state information, and cannot be redeployed to a lower power consuming edge system $106_i$. If (at block $310$) the service i is stateless, then the service power manager $112$ determines (at block $312$) whether a power mode required by service i consumes less power than a power mode of the edge system $106_i$ on which the service i is currently deployed, such as the edge system $106_i$ in which the executing service $106_E$ is running or another edge system $106_j$.

If (at block $312$) the service i requires a lower energy power mode than the edge system $106_i$ on which service i is deployed and will execute, then a determination is made (at block $314$) whether there is a more energy efficient edge system $106_j$, comprising an alternative edge system $106_j$, such as at the edge site, supporting the lower power mode of service i. The determined more energy efficient edge system $106_j$ may comprise the most energy efficient edge system $106_j$ operating at a lower power mode required by the service i. There may also be a latency requirement between the current server on which service i is deployed and a more energy efficient edge system $106_j$ to select for redeployment. If (at block $314$) a more energy efficient edge system $106_j$, such as at the edge site, is available, then the service i is indicated (at block $316$) on the low power mode service list $114$ and the service i is redeployed (at block $318$) to the determined more energy efficient edge system $106_j$ to execute when called. Adding service i to the low power mode service list $114$ ensures that this service i cannot be run at a higher power mode and cannot cascade a higher power consumption to other services and applications.

If the service i is not on the same edge system as the executing service $106_E$ (from the no branch of block $308$) or service i is not stateless, i.e., is stateful (from the no branch of block $310$) or the power mode required by service i is not less than energy consumed by power mode of the edge system $106_i$ (from the no branch of block $312$) or if there is not a more energy efficient edge system supporting the power mode of the service i (from the no branch of block $314$), then control proceeds to block $320$ to consider a next service in the subgraph until all services in the subgraph are considered. From block $318$, control proceeds (at block $320$) to consider a next service in the subgraph.

With the embodiment of FIG. 3, when a service is executing, a subgraph of all services that may be called from the executing service $106_E$ is considered for redeployment to an edge system $106_j$ operating at a lower power mode than the edge system $106_i$ on which the service $108_i$ is currently operating to conserve energy by moving the service to the most energy efficient edge system supporting the minimal power mode required by the service $108_i$.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With respect to FIG. 4, computing environment 400 contains an example of an environment for the execution of at least some of the computer code involved in performing the inventive methods, such as the service power manager 112, low power mode service list 114, and the service call graph 116, to redistribute services to the most efficient energy system operating in the lowest power mode required for the services. In addition to block 445, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 445, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer-readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 445 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory

7

8

(RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface-type operating systems that employ a kernel. The code included in block 445 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer-readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on. In further embodiments, the EUDs 403 may comprise the user equipment $104_1 \ldots 104_n$ providing data to the services $108_i$ to process.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404. The remote server 404 may comprise the edge systems $106_1 \ldots 106_n$ in which the services $108_1 \ldots 108_n$ are deployed.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

CLOUD COMPUTING SERVICES AND/OR MICRO-SERVICES (not separately shown in FIG. 4): private and public clouds 406 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i, j, and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing power settings for services deployed on computing systems, the computer program product comprises a computer readable storage medium having program instructions embodied therewith that when executed cause operations, the operations comprising:

providing a call graph indicating multiple calls between interlinked services;

determining a first service in the call graph consuming energy at a first service power mode in a first computing system comprising one of the computing systems;

determining a second service, in the first computing system, operating at a second service power mode requiring less energy than a first system power mode of the first computing system, wherein the second service is in a subgraph of the call graph extending from the first service;

determining a second computing system, comprising one of the computing systems, operating at a second system power mode supporting the second service power mode; and redeploying the second service to the second computing system.

2. The computer program product of claim 1, wherein the determining the second service further comprises determining that the second service is in the first computing system in which the first service is executing.

3. The computer program product of claim 1, wherein the computing systems comprise edge systems at an edge site, wherein the determining the second computing system comprises:

determining a most energy efficient edge system at the edge site.

4. The computer program product of claim 1, wherein the subgraph includes a plurality of services in the call graph, wherein the determining the second service in the subgraph of the call graph comprises determining services in the subgraph requiring a power mode less than the first service power mode, and wherein the operations further comprise:

redeploying the determined services to the second computing system operating at a power mode satisfying the power mode required by the determined services and that is less than the first service power mode.

5. The computer program product of claim 1, wherein the operations further comprise:

maintaining the second service in the first computing system including the first service in response to the first service power mode not consuming more energy than consumed by the second service power mode.

6. The computer program product of claim 1, wherein the operations further comprise:

indicating the second service in a list, wherein a service indicated in the list is prevented from being assigned to one of the computing systems operating at a power mode greater than a power mode required by the service indicated in the list.

7. The computer program product of claim 1, wherein the subgraph includes a plurality of services in the call graph and has as a root comprising the first service.

8. The computer program product of claim 1, wherein the services comprise microservices, the call graph comprises a directed acyclic graph, and the computing systems comprise edge systems within an edge site.

9. The computer program product of claim 1, wherein the determining the second service further comprises determining that the second service comprises a stateless service.

10. The computer program product of claim 1, wherein the first service comprises an executing service.

11. A system for managing power settings for services deployed on computing systems, comprising:

a processor; and a computer readable storage medium having program instructions embodied therewith that when executed cause operations, the operations comprising:

providing a call graph indicating multiple calls between interlinked services;

determining a first service in the call graph consuming energy at a first service power mode in a first computing system comprising one of the computing systems;

determining a second service, in the first computing system, operating at a second service power mode requiring less energy than a first system power mode of the first computing system, wherein the second service is in a subgraph of the call graph extending from the first service;

determining a second computing system, comprising one of the computing systems not including the second service, operating at a second system mode supporting the second service power mode; and redeploying the second service to the second computing system.

12. The system of claim 11, wherein the determining the second service further comprises determining that the second service is in the first computing system in which the first service is executing.

13. The system of claim 11, wherein the operations further comprise:

maintaining the second service in the first computing system including the first service is deployed in response to the first service power mode not consuming more energy than consumed by the second service power mode.

14. The system of claim 11, wherein the subgraph includes a plurality of services in the call graph and has as a root comprising the first service.

15. The system of claim 11, wherein the determining the second service further comprises determining that the second service comprises a stateless service.

16. A computer implemented method for managing power settings for services deployed on computing systems, comprising:

providing a call graph indicating multiple calls between interlinked services;

determining a first service in the call graph consuming energy at a first service power mode in a first computing system comprising one of the computing systems;

determining a second service, in the first computing system, operating at a second service power mode requiring less energy than a first system power mode of the first computing system, wherein the second service is in a subgraph of the call graph extending from the first service;

determining a second computing system, comprising one of the computing systems, operating at a second system power mode supporting the second service power mode; and redeploying the second service to the second computing system.

17. The method of claim 16, wherein the determining the second service further comprises determining that the second service is in the first computing system in which the first service is executing.

18. The method of claim 16, further comprising:

maintaining the second service in the first computing system including the first service in response to the first service power mode not consuming more energy than consumed by the second service power mode.

19. The method of claim 16, wherein the subgraph includes a plurality of services in the call graph and has as a root comprising the first service.

20. The method of claim 16, wherein the determining the second service further comprises determining that the second service comprises a stateless service.

* * * * *